UNITED STATES PATENT OFFICE.

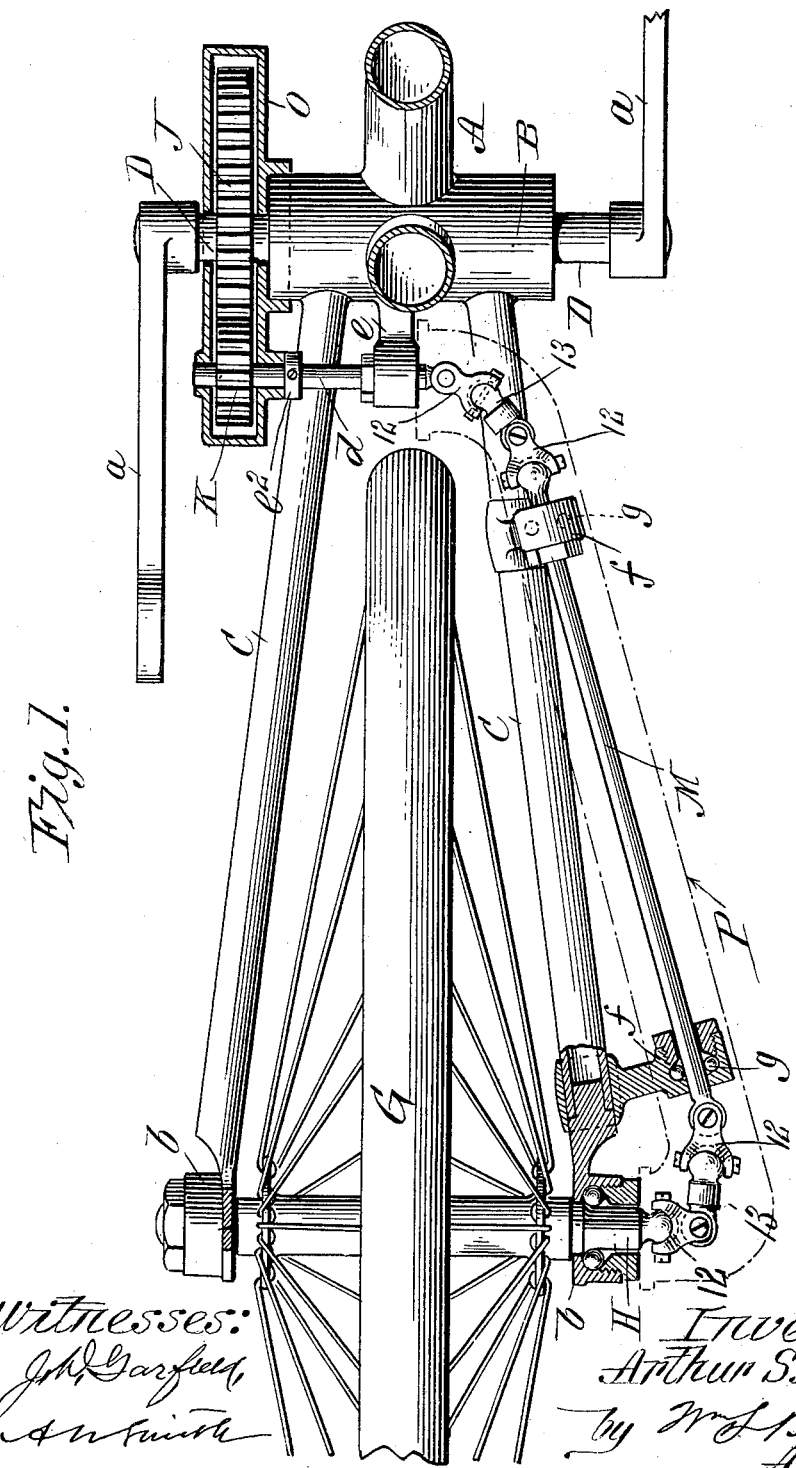

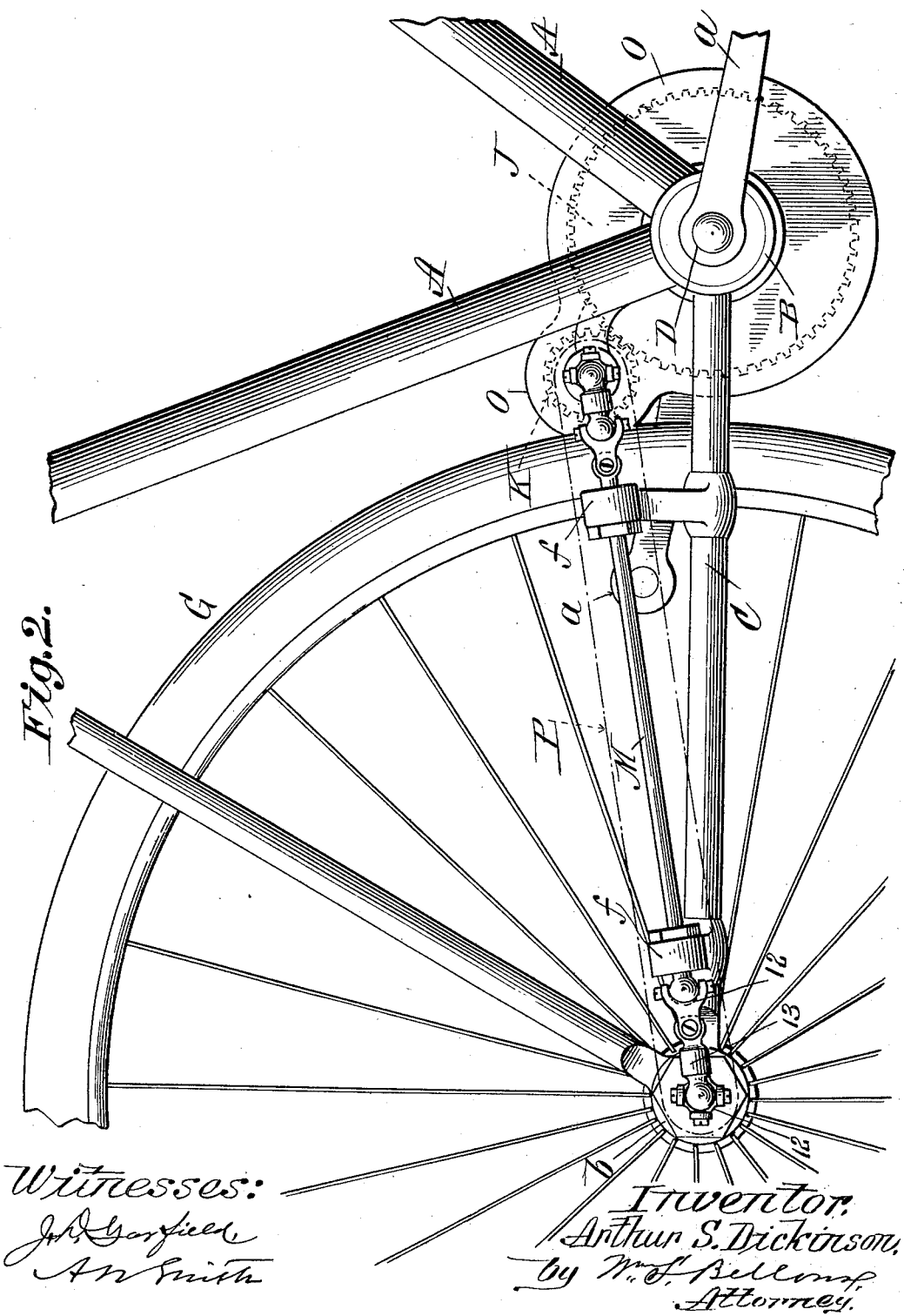

ARTHUR S. DICKINSON, OF ATLANTA, GEORGIA.

BICYCLE.

SPECIFICATION forming part of Letters Patent No. 668,873, dated February 26, 1901.

Application filed September 14, 1898. Serial No. 690,930. (No model.)

*To all whom it may concern:*

Be it known that I, ARTHUR S. DICKINSON, a citizen of the United States of America, and a resident of Atlanta, in the county of Fulton and State of Georgia, have invented certain new and useful Improvements in Bicycles, of which the following is a full, clear, and exact description.

This invention relates to improvements in driving mechanism for bicycles, the object being to devise a driving mechanism of extreme simplicity, avoiding the use of sprocket wheels and chain or of bevel-gearing.

The invention consists in the combination, with the crank-shaft of the bicycle and with the rear or driven wheel thereof, of a shaft geared to the crank-shaft and a shaft angular thereto, connected therewith by a universal joint of novel construction and having a similar novel universal-joint connection with the wheel to be driven, all whereby the rotary motion imparted by the crank to the crank-shaft is transmitted to the driven wheel in an easy, steady, and satisfactory manner.

The invention also consists in the detailed construction of the novel universal joint comprised in the transmission devices, which is hereinafter particularly described.

An exemplification of the invention is illustrated in the accompanying drawings, in which—

Figure 1 is a plan view and partial horizontal section of so much of the bicycle as is necessary to show the combination therewith of the driving mechanism. Fig. 2 is a side elevation substantially of the same.

Similar characters of reference indicate corresponding parts in both views.

Referring to the drawings, A represents a part of a bicycle-frame, comprising the crank-shaft bracket or hanger B and the rear fork members C C.

D represents the crank-shaft, having the cranks *a* thereon, as usual, and G represents the rear wheel, which is the driven wheel, the same being here understood as affixed to its axle H, mounted for rotation in suitable ball-bearings *b* at the extremities of the said rear forks C C. The crank-shaft has affixed thereon the comparatively large spur gear-wheel J, with which meshes the smaller spur gear-wheel K, the latter being affixed on the shaft or arbor *d*, for which suitable journal-supports are provided. As shown, there is a rearwardly-projecting lug *e*, formed as a part of or attached to an upper part of the crank-shaft hanger or to the frame near the hanger. The said frame is also at the other fork-leg provided with the two journal-support lugs *f*, equipped with ball-bearings *g* and serving as the journal-support for the rearwardly-extended shaft M. The forward end of said shaft M, which is angular to the transverse shaft *d*, is connected with shaft *d* by my new form of universal joint N.

Combined with the ball-formed or knob-like end-approached portions of the angularly-arranged shafts *d* M are the coupling members 12 12, each consisting of a double yoke, the bifurcated members at one end being arranged at right angles to the bifurcated members at the other end, the yoke of one coupling member being pivoted to one shaft end transversely of its axis, while a yoke of the other coupling member is pivoted to the other shaft and transversely of its axis and at right angles to the first-mentioned line of pivoting, and combined with and intermediate between the two double-yoke coupling members is the single knob-ended bar 13, the opposite ends of which are embraced by the approached yokes of both said coupling members, which yokes are in planes at right angles to each other and which contiguous parts are united by pivots which are right angular to each other, as well as to the pivots outwardly beyond, all as shown in the drawings. The end of the axle for the driven wheel G is also constructed with a ball or bulb, as is also the adjacent end of the aforesaid connecting-shaft M, with each of which bulb-like parts are similarly pivotally connected yokes 12, both being joined by the pivotally-connected intermediate bar 13.

The rotary motion imparted to the crank-shaft through the crank causes the rotation, by reason of the gears J K, of the shaft *d* at a higher rate of speed than that of the crank-shaft, and through the connecting-shaft M the gear-wheel G is rotated at the same rate of speed as the said shaft *d*.

The gears J and K are inclosed by the casing O, which is supported on one end of the crank-shaft hanger and, furthermore, constitutes a journal-bearing, in addition to the journal-lug e, for the counter-shaft d, and the connecting-shaft and the universal joints may be advantageously inclosed by a tubular casing (represented by P) supported upon the bicycle-frame.

The gearing up, whereby the driven wheel will be turned faster than the crank-shaft, may be practically varied to suit the strength or comfort of different riders in a well-known manner.

Having thus described my invention, what I claim as new, and desire to secure by Letters Patent, is—

In a bicycle, in combination, the crank-shaft hanger B, provided with the rearwardly-extended journal-lug e, and the casing O supported at one end of the said hanger; the rear-wheel fork members G, G, one thereof provided with the outwardly-extended support-lugs f, having the ball-bearings g; the rear wheel G having the hub thereof secured to the axle H therefor which is rotatable in bearings therefor at the rear end of the frame; the shaft d mounted for rotation in the said journal-lug e and said casing O, parallel with crank-shaft; the gear-wheel J on the crank-shaft and the gear-wheel K on said shaft d, both inclosed by said casing; the shaft M extending forwardly and rearwardly and mounted in the said support-lugs f; and the universal joints connecting the shaft M with the angularly-arranged axle H, and shaft d, each consisting of yoke members pivoted to the adjacent ends of the said angularly-arranged parts on lines at right angles to each other, and the single bar 13 having the end portions thereof pivoted to the yokes on lines at right angles, the four lines of pivotal connections being alternately at right angles to the next, substantially as described.

ARTHUR S. DICKINSON.

Witnesses:
A. E. WHEELER,
C. B. CRENSHAW.